United States Patent
Buffa

(10) Patent No.: US 9,835,874 B2
(45) Date of Patent: Dec. 5, 2017

(54) SHEET FOR MANUFACTURING ARTICLES, PARTICULARLY GLASSES AND THE LIKE, AND ASSOCIATED MANUFACTURING PROCESS

(71) Applicant: LUXOTTICA S.R.L., Agordo (IT)

(72) Inventor: Federico Gianluigi Buffa, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 9 days.

(21) Appl. No.: 14/910,619

(22) PCT Filed: Jul. 29, 2014

(86) PCT No.: PCT/EP2014/066249
§ 371 (c)(1),
(2) Date: Feb. 5, 2016

(87) PCT Pub. No.: WO2015/018692
PCT Pub. Date: Feb. 12, 2015

(65) Prior Publication Data
US 2016/0178928 A1    Jun. 23, 2016

(30) Foreign Application Priority Data
Aug. 5, 2013   (IT) .......................... MI2013A001336

(51) Int. Cl.
*G02C 5/14* (2006.01)
*G02C 5/00* (2006.01)
*G02C 5/18* (2006.01)

(52) U.S. Cl.
CPC .............. *G02C 5/008* (2013.01); *G02C 5/18* (2013.01); *G02C 2200/12* (2013.01); *G02C 2200/14* (2013.01)

(58) Field of Classification Search
CPC ........ G02C 5/14; G02C 5/16; G02C 2200/12; G02C 2200/14; G02C 2200/16; G02C 2200/10
(Continued)

(56) References Cited

U.S. PATENT DOCUMENTS

| 2011/0170051 A1* | 7/2011 | Jacquemin ............... G02C 1/02 351/114 |
| 2013/0069274 A1* | 3/2013 | Zhang ................. B29C 45/1671 264/279 |

FOREIGN PATENT DOCUMENTS

| EP | 0332540 A1 | 9/1989 |
| GB | 626350 A | 7/1949 |

(Continued)

OTHER PUBLICATIONS

International Search Report dated Aug. 28, 2014 re: Application No. PCT/Ep2014/066249; pp. 1-4; citing: WO 2010/034911 A1, GB 626 350 A, WO 2008/136036 A2 and EP 0 332 540 A1.
(Continued)

*Primary Examiner* — Hung Dang
(74) *Attorney, Agent, or Firm* — Cantor Colburn LLP

(57) ABSTRACT

A sheet for manufacturing articles, particularly frames for glasses and the like, including at least one technical layer made of a thermoplastic material interposed between a first aesthetic layer and a second aesthetic layer, both made of a material such as fabric. A method for producing a sheet for manufacturing articles includes the steps of providing at least one technical layer made of a material such as thermoplastic polymers and at least two aesthetic layers made of a material such as fabric and associating the technical layer with the aesthetic layers. The layers are mutually compressed and then heated to obtain the sheet.

10 Claims, 2 Drawing Sheets

(58) Field of Classification Search
USPC ......... 351/114, 111, 41, 117, 51, 158; 29/20
See application file for complete search history.

(56) References Cited

FOREIGN PATENT DOCUMENTS

WO     2008136036 A2    11/2008
WO     2010034911 A1    4/2010

OTHER PUBLICATIONS

Written Opinion dated Aug. 28, 2014 re: Application No. PCT/EP2014/066249; pp. 1-6; citing: WO 2010/034911 A1, GB 626 350 A, WO 2008/136036 A2 and EP 0 332 540 A.

* cited by examiner

SHEET FOR MANUFACTURING ARTICLES, PARTICULARLY GLASSES AND THE LIKE, AND ASSOCIATED MANUFACTURING PROCESS

TECHNICAL FIELD

The present disclosure relates to a sheet for manufacturing articles, particularly glasses and the like, and to the associated method for manufacturing said sheet.

BACKGROUND

In the glasses sector it is currently known to use frames made of materials such as cellulose acetate, or of materials such as plastics, generally obtained by means of injection molding techniques, or also made of composite materials such as carbon, but also basalt, glass, et cetera.

Glasses made of acetate are known in particular for their comfort and for the aesthetic effects that distinguish them, because they evoke visual and sensory sensations of materials such as ebony, ivory, ceramic.

Glasses provided by means of plastics injection molding or pouring techniques are instead known for their characteristics of mechanical and thermal strength, although they do not allow to obtain chromatic effects that can be compared to those of eyeglasses made of acetate. Glasses made of composite materials also have optimum technical characteristics in terms of weight/strength ratio and therefore in terms of light weight and flexibility.

However, said glasses of the known type have aesthetic characteristics that, although differentiated depending on the models and on the types of materials used for the frame, are generally common to all glasses.

SUMMARY

The aim of the present disclosure is to provide a frame for glasses that has particular aesthetic characteristics, at the same time ensuring comfort and mechanical characteristics at least equal to those of frames for conventional glasses.

Within this aim, the present disclosure provides a frame for glasses that is easy to adapt to the face of the user.

The disclosure further provides a frame for glasses that is capable of giving the greatest assurances of reliability and safety in use.

The disclosure also provides a frame for glasses that is easy to provide and economically competitive if compared with the background art.

The disclosure further provides a frame for glasses that requires a shorter production cycle than the production cycles of frames for conventional glasses.

The disclosure also provides a frame for glasses that requires production equipment that is cheaper than the equipment for manufacturing frames for conventional glasses.

These aims will become better apparent hereinafter are achieved by providing a sheet for manufacturing articles, particularly frames for glasses and the like, wherein the sheet comprises at least one technical layer made of a material such as polymers and at least one aesthetic layer made of a material such as fabric.

Moreover, these aims that will become better apparent hereinafter are achieved by providing a method for producing a sheet for manufacturing articles, particularly frames for glasses and the like, wherein the method includes the following steps:

having at least one technical layer made of a material such as polymers and at least one aesthetic layer made of a material such as fabric;

associating said at least one technical layer with said at least one aesthetic layer;

mutually compressing said at least one technical layer and said at least one aesthetic layer;

heating said at least one technical layer and said at least one aesthetic layer, which are mutually associated, to obtain said sheet.

BRIEF DESCRIPTION OF THE DRAWINGS

Further characteristics and advantages will become better apparent from the description of a preferred but not exclusive embodiment of a sheet for manufacturing articles, particularly frames for glasses and the like, illustrated by way of non-limiting example with the aid of the accompanying drawings, wherein.

DETAILED DESCRIPTION OF THE DRAWINGS

Figure 1:
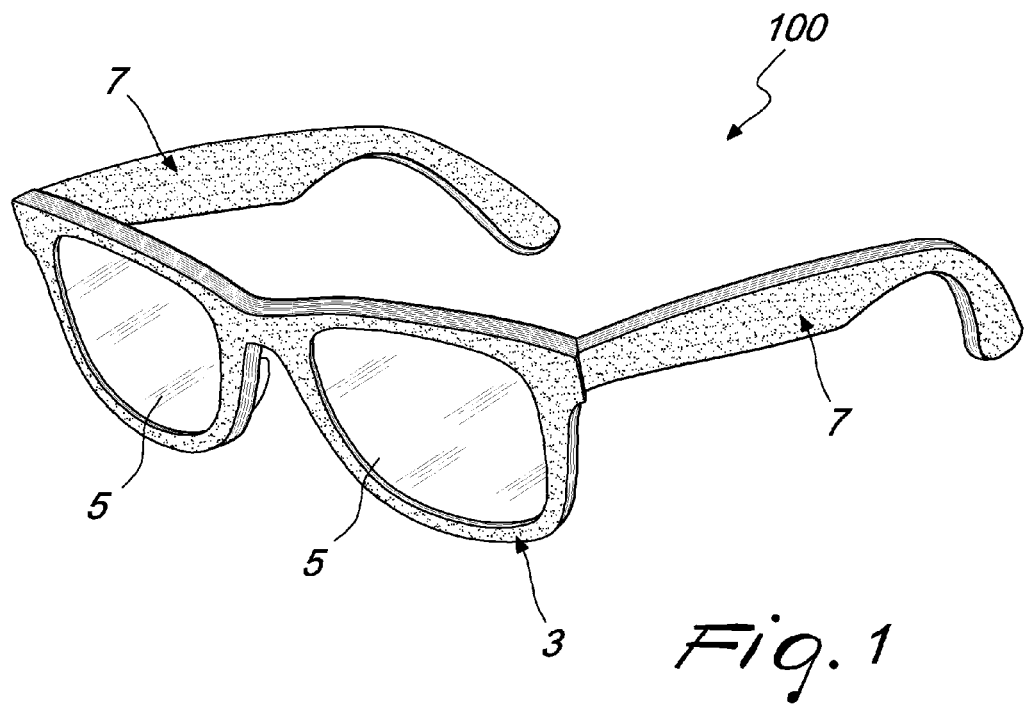
FIG. 1 is a perspective view of a frame for glasses provided starting from a sheet, according to the disclosure.
Figure 2:
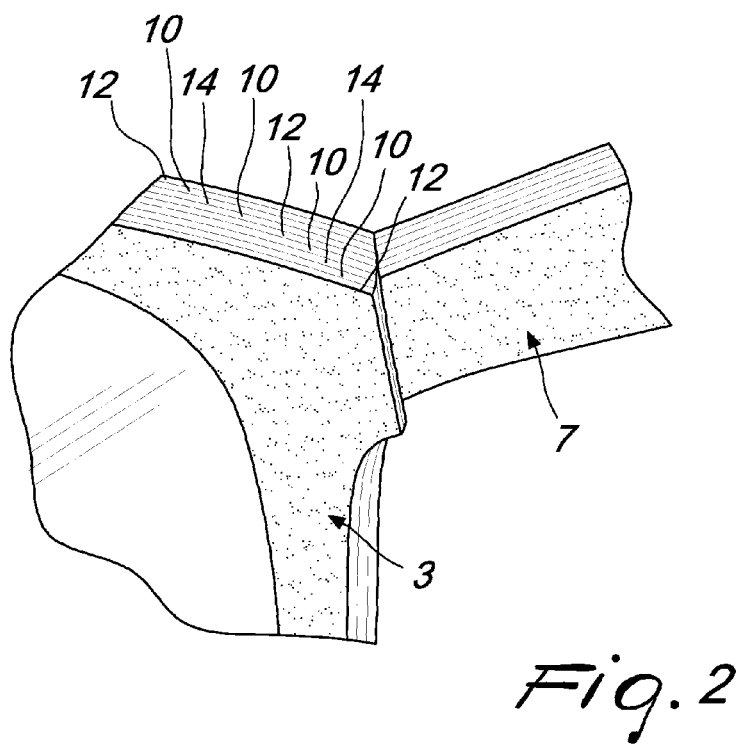
FIG. 2 is an enlarged-scale view of a detail of the frame of FIG. 1, according to the disclosure.

With reference to the figures, the sheet for manufacturing articles, particularly frames for glasses and the like, is generally designated by the reference numeral 1.

According to the disclosure, the sheet 1 comprises at least one technical layer 10 made of a material such as polymers and at least one aesthetic layer 12, 14 made of a material such as fabric. In particular, the material of the technical layer 10 can be comprised in the so-called category of thermoplastics.

Advantageously, the material of the technical layer 10 is a polyolefin, and preferably polypropylene.

Polypropylene is a material that has good mechanical characteristics of resistance to loads, to traction, to impact and to abrasion. Moreover, polypropylene is odorless and physiologically harmless, making it an excellent material for products that are in very close contact with human beings.

The material of the aesthetic layer 12, 14 is fabric made of natural fibers and/or synthetic fibers, advantageously denim fabric, or silk, or velvet, or also aramid fibers.

Figure 3:
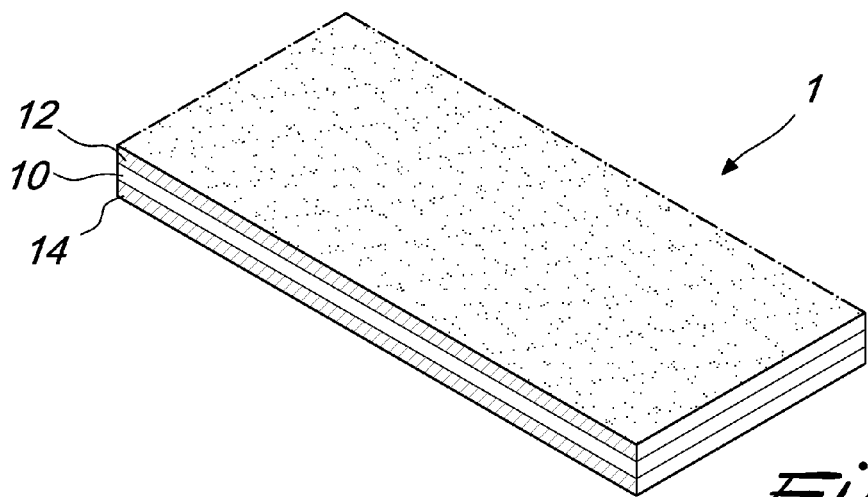
FIG. 3 is a schematic view of a sheet, according to the disclosure.

In particular, as shown schematically in FIG. 3, the sheet 1 can comprise advantageously a first aesthetic layer 12 and a second aesthetic layer 14, both made of a material such as fabric, and in which the technical layer 10 is interposed between the first aesthetic layer 12 and the second aesthetic layer 14. In this manner, the technical layer 10 is advantageously embedded between the two aesthetic layers 12 and 14. It should be noted that said aesthetic layers 12 and 14 may be made of the same type of fabric or of different fabrics.

For example, the aesthetic layer in contact with the skin of the user can be made of velvet or silk and the external technical layer can be made of denim fabric, or vice versa.

The sheet 1, however, can comprise a plurality of aesthetic layers 12, 14 alternated with technical layers 10, so as to vary at will the thickness of the sheet 1 proper.

Figure 4:
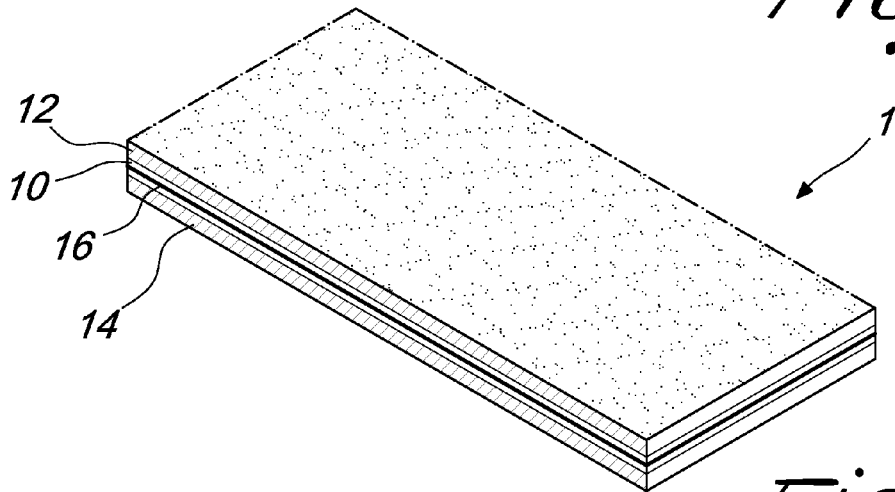
FIG. 4 is a schematic view of a first variation of the sheet of FIG. 3, according to the disclosure.
Figure 5:
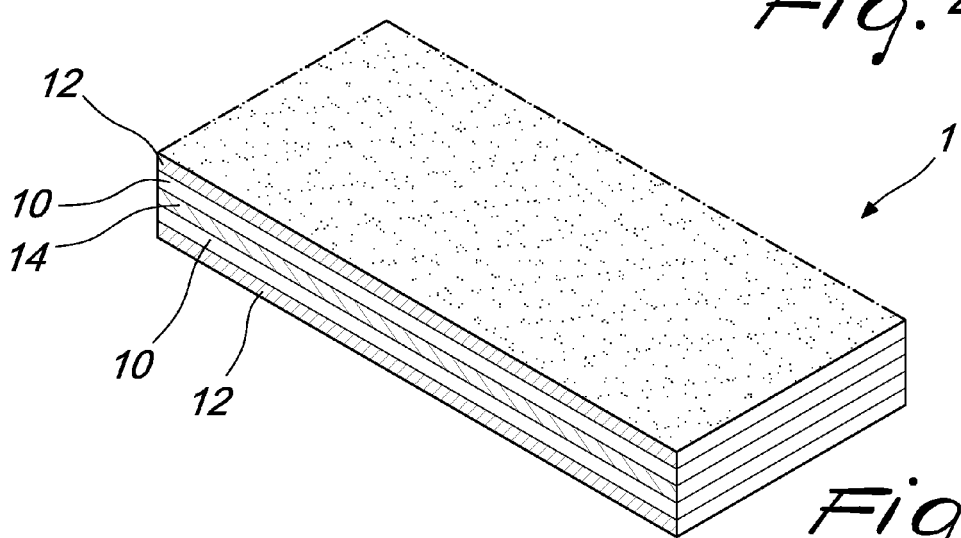
FIG. 5 is a schematic view of a second variation of the sheet of FIG. 3, according to the disclosure.

FIG. 4 concerns a first variation of the sheet 1, which shows how the technical layer 10 is adapted to receive a metallic core 16, as will be explained better hereinafter.

FIG. 1 shows a frame 100 for eyeglasses and the like, which comprises a front 3 adapted to accommodate a pair of lenses 5 and two lateral temples 7. The front 3 and the temples 7 are advantageously obtained from one or more sheets 1.

The method for producing a sheet 1 for manufacturing articles, particularly frames for glasses and the like, according to the disclosure, comprises the steps of
- having at least one technical layer 10 made of a material such as polymers and at least one aesthetic layer 12 made of a material such as fabric;
- associating the technical layer 10 with the aesthetic layer 12, 14;
- mutually compressing the technical layer 10 and the aesthetic layer 12, 14;
- heating the technical layer 10 and the aesthetic layer 12, 14, which are mutually associated, in order to obtain the sheet 1.

Advantageously, the step of mutually compressing the technical layer 10 and the aesthetic layer 12, 14, or the several technical and aesthetic layers that provide the sheet 1, and the step of heating the technical layer 10 and the aesthetic layer 12, 14, or the several mutually associated technical and aesthetic layers, are simultaneous. These steps can be achieved by means of heating hydraulic presses.

The method for producing the sheet 1 can comprise furthermore steps for surface treatments depending on the desired final effect. For example, there can be a coloring step, a waterproofing step, a finishing step for giving particular effects such as vintage, ordered in the sequence that is most suitable for the aesthetic result being sought.

A preferred but not exclusive embodiment of the method for producing the sheet 1 is described hereinafter.

The method begins with the preparation of a sheet, termed main sheet, which is obtained by arranging in a mutually adjacent manner a technical layer 10, an aesthetic layer 12, 14 and another technical layer 10. The sheet thus obtained can be pressed, for example by means of aluminum plates of a mold, and then heated to the melting point of the polymer of the technical layer 10. In the case of polypropylene, the melting point is comprised approximately in the range between 165° C. and 170° C. and the heating time required is approximately 25-30 minutes. Such main sheet will have a thickness comprised advantageously in a range between 0.9 and 1.5 millimeters.

In the preferred embodiment described herein, the production of the sheet from which the front 3 of the frame 100 is to be obtained entails arranging in a mutually adjacent manner and in sequence: an aesthetic layer 12, 14, a technical layer 10, one or more of said main sheets, preferably three, a further technical layer 10 and a further aesthetic layer 12, 14.

Such composition of layers is then subjected to the same step of compression and heating described above. Said sheet for producing the front 3 will have a final thickness comprised preferably between 4 and 10 mm.

The production of the sheet from which the lateral temples 7 of the frame 100 is to be provided entails instead arranging in a mutually adjacent arrangement and in sequence: an aesthetic layer 12, 14, a technical layer 10, a main sheet, another technical layer 10, another main sheet, a further technical layer 10, and finally a further aesthetic layer 12, 14. Such composition of layers is then subjected to the same step of compression and heating described above.

Said sheet for producing the lateral temples 7 will have a final thickness comprised preferably between 2 and 6 mm.

Both the lateral temples 7 and the front 3 can comprise a metallic core 16 conveniently coupled to a technical layer 10, adapted to ensure the adjustability of the frame 100, and/or to make the frame 100 mechanically stronger.

The core 16 can be embedded in the technical layer or can be interposed between the technical layer 10 and at least one of the first and second aesthetic layers 12, 14.

The coupling of a metallic core 16 allows moreover advantageously to reduce the number of technical and aesthetic layers necessary in order to give the frame 100 the desired thickness, therefore making said frame 100 lighter.

The materials such as fabric used for the aesthetic layer 12, 14 are advantageously materials capable of withstanding the melting points of the material such as the polymers of the technical layer 10.

The use of the term "technical" with reference to the technical layer 10 and of the term "aesthetic" with reference to the aesthetic layer 12, 14 is not to be understood as limiting, because both layers, the technical one 10 and the aesthetic one 12 and 14, contribute both to the aesthetic appearance of the frame 100 and to its mechanical characteristics.

Once the sheets made in fabric (denim) have been formed and cooled, one proceeds with a step of trimming the edges so as to remove the excess polypropylene, and then the sheets are left to stabilize for a certain period of time before proceeding with the subsequent surface treatment steps.

After the surface treatment steps, the sheets are subjected to a milling treatment.

In practice it has been found that the sheet for providing articles, particularly glasses and the like, and the corresponding method for providing said sheet according to the disclosure achieve the intended aims, since they allow to obtain particular aesthetic characteristics, ensuring at the same time comfort and mechanical characteristics at least equal to those of frames for conventional glasses.

The sheet, the method and the frame thus conceived are susceptible of numerous modifications and variations.

Thus, for example, the step of inserting the metallic core can be provided directly on the sheet that is then milled, or can be provided after the milling step on the individual components of the frame, i.e., the temples and the front.

All the details may further be replaced with other technically equivalent elements.

In practice, the materials used, so long as they are compatible with the specific use, as well as the contingent shapes and dimensions, may be any according to requirements and to the state of the art.

The disclosures in Italian Patent Application No. MI2013A001336 from which this application claims priority are incorporated herein by reference.

The invention claimed is:

1. A sheet for manufacturing articles, particularly frames for glasses, comprising at least one technical layer made of a thermoplastic material that is interposed between a first aesthetic layer and a second aesthetic layer, both made of a material such as fabric, wherein said at least one technical layer is adapted to receive a metallic core interposed between said technical layer and one of said first and second aesthetic layers.

2. The sheet for manufacturing articles, according to claim 1, wherein the material of said technical layer is a polyolefin.

3. The sheet for manufacturing articles, according to claim 1, wherein the material of said at least one technical layer is polypropylene.

4. The sheet for manufacturing articles, according to claim 1, wherein the material of at least one of said first and second aesthetic layers is denim fabric.

5. The sheet for manufacturing articles, according to claim 1, comprising a plurality of said aesthetic layers alternated with said technical layers.

6. The sheet for manufacturing articles, according to claim 1, comprising at least two technical layers that are interposed between three aesthetic layers alternated with said technical layers.

7. A frame for eyeglasses comprising a front adapted to accommodate a pair of lenses and two lateral temples, wherein said front and said lateral temples are obtained from one or more sheets according to claim 1.

8. A method for producing a sheet for manufacturing articles, particularly frames for eyeglasses, comprising the steps of:

having at least one technical layer made of a material such as thermoplastic polymers and at least two aesthetic layers made of a material such as fabric;

associating said at least one technical layer with said at least two aesthetic layers;

mutually compressing said at least one technical layer and said at least two aesthetic layers;

heating said at least one technical layer and said at least two aesthetic layers mutually associated to obtain said sheet; and interposing a metallic core between said at least one technical layer and one of said at least two aesthetic layers.

9. The method for producing a sheet, according to claim 8, wherein said step of mutually compressing said at least one technical layer and said at least two aesthetic layers and said step of heating said at least one technical layer and said at least two mutually associated aesthetic layers are simultaneous.

10. The method for producing a sheet, according to claim 8, further comprising one or more steps of surface treatments of said sheet.

* * * * *